EMILY W. MEYERS, OF LINCOLN, ILLINOIS.

Letters Patent No. 90,675, dated June 1, 1869.

---

IMPROVED COMPOSITION FOR THE PRODUCTION OF WAX FLOWERS, FRUIT, &c.

---

The Schedule referred to in these Letters Patent and making part of the same.

---

*To all whom it may concern:*

Be it known that I, EMILY W. MEYERS, of Lincoln, in the county of Logan, and in the State of Illinois, have invented a new and useful Composition for the Production of Wax Flowers, Fruits, Medallion-Heads, &c.; and do hereby that the following is a full, clear, and exact description thereof.

The nature of my invention consists in adding to white wax, other ingredients which shall give it a better color, increase its durability, and at the same time render said compound more tenacious and pliable, and consequently easier worked, as is fully explained below.

To one pound of pure white wax I add one ounce of gum-dammar, or gum-mastic, one tablespoonful of balsam of fir, and three inches of silver-white, and mix the ingredients thoroughly.

The object of the gum-dammar or gum-mastic is to render the compound more pliable, while the balsam of fir increases its tenacity, and the silver-white gives the mass a beautiful silvery appearance, whereby the whole, thus compounded, is peculiarly adapted for use in the production of artificial flowers, fruits, or for moulding medallions.

Having thus fully set forth the nature and merits of my invention,

What I claim as new, and desire to secure by Letters Patent, is—

The within-described compound, for the production of artificial flowers, fruits, &c., substantially as shown and described.

In testimony that I claim the foregoing, I have hereunto set my hand, this 27th day of April, 1869.

EMILY W. MEYERS.

Witnesses:
 GEO. O. MARCY,
 JNO. B. HARRISON.